US005164108A

United States Patent [19]

Appel et al.

[11] Patent Number: 5,164,108

[45] Date of Patent: * Nov. 17, 1992

[54] PROCESS FOR PREPARING HIGH BULK DENSITY DETERGENT COMPOSITIONS

[75] Inventors: Peter W. Appel, Rotterdam; Lucas D. M. van den Breckel, Berkel en Rodenrijs; Seeng D. Liem, Rhoon; Petrus L. J. Swinkels, Vlaardingen, all of Netherlands

[73] Assignee: Lever Brothers Company, Division of Conopco, Inc., New York, N.Y.

[ * ] Notice: The portion of the term of this patent subsequent to Jul. 28, 2009 has been disclaimed.

[21] Appl. No.: 585,856

[22] Filed: Sep. 19, 1990

[30] Foreign Application Priority Data

Sep. 29, 1989 [GB] United Kingdom ................. 8922018

[51] Int. Cl.[5] ...................... C11D 11/04; C11D 17/06; B29C 67/00

[52] U.S. Cl. ................................... 252/174; 252/89.1; 252/174.14; 252/174.25; 264/117; 264/342 R

[58] Field of Search .................. 252/174, 174.13, 89.1, 252/174.14, 135, 174.25; 264/117, 342 R

[56] References Cited

U.S. PATENT DOCUMENTS

| | | | |
|---|---|---|---|
| 4,372,868 | 2/1983 | Saran | 252/174 |
| 4,587,031 | 5/1986 | Kruse | 252/174 |
| 4,846,049 | 7/1989 | Tersuchi . | |
| 4,869,843 | 9/1989 | Saito | 252/174.13 |
| 4,925,585 | 5/1990 | Strauss | 252/174 |

FOREIGN PATENT DOCUMENTS

| | | |
|---|---|---|
| 0219328 | 4/1987 | European Pat. Off. . |
| 0367839 | 5/1990 | European Pat. Off. . |
| 1369269 | 10/1974 | United Kingdom . |
| 1517713 | 10/1974 | United Kingdom . |
| 2221695 | 2/1990 | United Kingdom . |

OTHER PUBLICATIONS

JP 60-072,999 (Kao)-Abstract Seifen-Ole-Fette-Wachse, vol. 114-No. 8/1988, p. 315-316 (Translation).

*Primary Examiner*—Paul Lieberman
*Assistant Examiner*—Erin M. Higgins
*Attorney, Agent, or Firm*—James J. Farrell

[57] ABSTRACT

A process for preparing a granular detergent composition or component having a bulk density of at least 550 g/l, which comprises (i) feeding a liquid acid precursor of an anionic surfactant, a solid water-soluble alkaline inorganic material and optionally other materials into a high-speed mixer/densifier, the mean residence time being from about 5 to 30 seconds;

(ii) subsequently treating the granular detergent material in a moderate-speed granulator/densifier, whereby it is brought into or maintained in a deformable state, the mean residence time being from about 1-10 minutes; and finally (iii) drying and/or cooling the detergent material.

15 Claims, No Drawings

PROCESS FOR PREPARING HIGH BULK DENSITY DETERGENT COMPOSITIONS

TECHNICAL FIELD

The present invention relates to a process for preparing a granular detergent composition or component having a high bulk density and good powder properties. More in particular, it relates to a process for the continuous preparation of such detergent compositions. Furthermore, it relates to a granular detergent composition obtainable by the process of the present invention.

BACKGROUND AND PRIOR ART

Recently there has been considerable interest within the detergents industry in the production of detergent powders having a relatively high bulk density, for example 550 g/l and above.

Generally speaking, there are two main types of processes by which detergent powders can be prepared. The first type of process involves spray-drying an aqueous detergent slurry in a spray-drying tower. In the second type of process the various components are dry-mixed and optionally agglomerated with liquids, e.g. nonionics.

The most important factors which determine the bulk density of the final detergent powder are the chemical composition of the slurry in the case of a spray-drying process, and the bulk density of the starting materials in the case of a dry-mixing process. Both factors can only be varied within a limited range. For example, the bulk density of a dry-mixed powder can be increased by increasing its content of relatively dense sodium sulphate, but this does not contribute to the detergency of the powder so that its overall properties as a washing powder will generally be adversely affected.

Therefore, a substantial increase in bulk density can only be achieved by processing steps which lead to densification of the detergent powders. There are several processes known in the art leading to such densification. Particular attention has thereby been paid to densification of spray-dried powders by post-tower treatment.

In his article in Seifen-Öle-Fette-Wachse (114, 8, pages 315-316 (1988)), B. Ziolkowsky describes a process for the continuous manufacture of a detergent powder having an increased bulk density by treating a spray-dried detergent composition in two-step post-tower process, which can be carried out in a Patterson-Kelly Zig-Zag ® agglomeration apparatus. In the first part of this machine, the spray-dried powder is fed into a rotating drum, in which a liquid-dispersing wheel equipped with cutting blades is rotating. In this first processing step a liquid is sprayed on to the powder and is thoroughly admixed therewith. By the action of the cutters, the powder is pulverized and the liquid causes agglomeration of the pulverized powder to form particles having an increased bulk density compared to that of the starting material.

The bulk density increase obtained is dependent on a number of factors, such as the residence time in the drum, its rotational speed and the number of cutting blades. After a short residence time, a light product is obtained, and after a long residence time a denser product. In the second part of the machine, which is essentially a rotating V-shaped tube, the final agglomeration and conditioning of the powder take place. After the densification process, the detergent is cooled and/or dried.

An example of a non-tower route for preparing a high bulk density detergent powders given in the Japanese patent application 60 072 999 (Kao). This application discloses a batch process whereby a detergent sulphonic acid, sodium carbonate, water and optionally other ingredients are brought into a high-shear mixer, followed by cooling to 40° C. or below, pulverizing with zeolite powder and granulating.

Although it is possible by means of one or more of the above-mentioned processes to prepare detergent powders having an increased bulk density, each of those routes has its own disadvantages. It is an object of the present invention to provide an improved continuous process for obtaining high bulk density detergent compositions, or components thereof, having a bulk density of at least 550 g/l. The process should especially be suitable for the large scale manufacture of such compositions.

We have now found that granular detergent compositions or components having a high bulk density may be prepared by reacting a liquid acid precursor of an anionic surfactant with a solid water-soluble alkaline inorganic material in a high-speed mixer/densifier, treating the material in a moderate-speed granulator/densifier, and finally drying and/or cooling the material. The heat of the neutralization reaction between the acid surfactant precursor and the alkaline material is thereby used to bring the starting material into a deformable state, which was found to be necessary for obtaining a densification of the detergent composition.

DEFINITION OF THE INVENTION

In a first aspect, the present invention accordingly provides a process for the continuous preparation of a granular detergent composition or component having a bulk density of at least 550 g/l, which comprises (i) feeding a liquid acid precursor of an anionic surfactant, a solid water-soluble alkaline inorganic material and optionally other materials into a high-speed mixer/densifier, the mean residence time being from about 5 to 30 seconds;

(ii) subsequently treating the granular detergent material in a moderate-speed granulator/densifier, whereby it is brought into or maintained in a deformable state, the mean residence time being from about 1-10 minutes; and finally (iii) drying and/or cooling the product.

In a second aspect, the invention provides a granular detergent composition or component prepared by this process.

DETAILED DESCRIPTION OF THE INVENTION

The present invention is concerned with the preparation of a high bulk density detergent powder or detergent component by means of a continuous process which involves the in situ neutralization of the acid precursor of an anionic surfactant with an alkaline solid component. An important characteristic of the present process is that the detergent material remains throughout the process in particulate or granular form. Caking, balling and dough formation are avoided and the final product does not require an additional step in which the particle size is reduced.

In the first step of the process of the invention, a solid water-soluble alkaline inorganic material is thoroughly mixed with a liquid acid precursor of an anionic surfactant, possibly in the presence of other materials. The acidic anionic surfactant precursor is thereby partly or totally neutralized to form a salt of the anionic surfactant.

In principle, any solid water-soluble alkaline inorganic material can be used in the present process. The preferred material is sodium carbonate, alone or in combination with one or more other water-soluble inorganic materials, for example, sodium bicarbonate or silicate. Sodium carbonate can provide the necessary alkalinity for the wash process, but it can additionally serve as a detergency builder. The invention may be advantageously used for the preparation of detergent powders in which sodium carbonate is the sole or principal builder. In this case, substantially more carbonate will be present than required for the neutralization reaction with the acid anionic surfactant precursor.

The solid alkaline starting material for the process may comprise other compounds usually found in detergent compositions, such as builders, e.g. sodium tripolyphosphate or zeolite, surfactants, e.g. anionics or nonionics, all well known in the art. Other examples of materials which may be present include fluorescers; polycarboxylate polymers; anti-redeposition agents, such as carboxy methyl cellulose; fatty acids; fillers, such as sodium sulphate; diatomaceous earth; calcite; clays, e.g. kaolin or bentonite.

The starting material for the process of the invention may be prepared by any suitable method, such as spray-drying or dry-mixing. It is considered to be one or the advantages of the process of this invention that high bulk density detergent powders may be prepared from dry-mixed starting materials, without the need for expensive spray-drying equipment. On the other hand, it may also be desirable that one or more of the ingredients are adjuncts of liquids onto solid components, prepared by spray-drying, granulation or via in situ neutralization in a high-speed mixer.

The process is very flexible with respect to the chemical composition of the starting material. Phosphate containing as well as zeolite containing compositions and compositions having either a low or a high active content may be used. The process is also suitable for preparing calcite/carbonate containing detergent compositions.

The process of the invention is thereby suitable for preparing detergent powders having widely different chemical compositions. The final high bulk density detergent product may for example comprise 5 to 60 wt% of a builder, 5 to 25 wt% carbonate, 5 to 40 wt% anionic surfactant, 0 to 20 wt% nonionic surfactant and 0 to 5 wt% soap.

The liquid acid precursor of an anionic surfactant may be selected from linear alkyl benzene sulphonic acids, alpha-olefin sulphonic acids, internal olefin sulphonic acids, fatty acid ester sulphonic acids and combinations thereof. The process of the invention is especially useful for producing compositions comprising alkyl benzene suphonates by reaction of the corresponding alkyl benzene sulphonic acid, for instance Dobanoic acid ex Shell.

Another preferred class of anionic surfactants are primary or secondary alkyl sulphates. Linear or branched primary alkyl sulphates having 10 to 15 carbon atoms are particularly preferred. These surfactants can be obtained by sulphatation of the corresponding primary or secondary alcohols, followed by neutralization. Because the acid precursors of alkyl sulphates are chemically unstable, they are not commercially available and they have to be neutralized as quickly as possible after their manufacture. The process of the present invention is especially suitable for incorporating alkyl sulphate surfactants into detergent powders because it involves a very efficient first mixing step wherein the acid surfactant precursor and the solid alkaline substance are brought into contact with one another. In this first step a quick and efficient neutralization reaction is effected whereby the decomposition of the alkyl sulphate acid is successfully kept at a minimum.

In the first step of the process, the solid starting material or materials are very thoroughly mixed with the liquid components by means of a high-speed mixer/densifier. Such a mixer provides a high energy stirring input and achieves thorough mixing in a very short time.

As high-speed mixer/densifier we advantageously used the Lödige (Trade Mark) CB 30 Recycler. This apparatus essentially consists of a large, static hollow cylinder having a diameter of about 30 cm which is horizontally placed. In the middle, it has a rotating shaft with several different types of blades mounted thereon. It can be rotated at speeds between 100 and 2500 rpm, dependent on the degree of densification and the particle size desired. The blades on the shaft provide a thorough mixing action of the solids and the liquids which may be admixed at this stage. The mean residence time is somewhat dependent on the rotational speed of the shaft, the position of the blades and the weir at the exit opening.

Other types of high-speed mixers/densifiers having a comparable effect on detergent powders can also be contemplated. For instance, a Shugi (Trade Mark) Granulator or a Drais (Trade Mark) K-TTP 80 may be used.

In the first step of the process according to the invention, the starting materials are thoroughly mixed in a high-speed mixer/densifier for a relatively short time of about 5-30 seconds, preferably under conditions whereby the starting material is brought into, or maintained in, a deformable state, to be defined hereafter.

In the high-speed mixer/densifier the liquid acid precursor of the anionic surfactant is added. It is almost instantly mixed with the alkaline inorganic water-soluble material and the neutralization reaction begins. The amount of free water present is believed to be very important for the reaction speed. The term "free water" is used herein to indicate water that is not firmly bound as water of hydration or crystallization to inorganic materials. If an insufficient amount of free water is present, the neutralization reaction will proceed slowly or not at all and the reaction mixture leaving the high-speed mixer/densifier will still contain substantial amounts of unreacted acid precursor of the anionic surfactant. This may cause agglomeration of the powder or even dough formation in the second processing step.

The solid starting material may already contain sufficient free water for these conditions to be attained. For example, a spray-dried detergent base powder blown to a relatively high water content could provide all the free water required. If insufficient free water is present, a carefully controlled amount of water should be added in the high-speed mixer/densifier, either admixed with the acid precursor or sprayed on separately.

Consequently, a small amount of water should be present, just sufficient to initiate the neutralization reaction, but not sufficient to cause substantial agglomeration. It will constitute no problem for the skilled artisan to determine the optimal conditions for a specific situation.

Apart from the liquid acid precursor of the anionic surfactant, other liquid components may also be introduced in the high-speed mixer/granulator. Examples of such ingredients include nonionic surfactants and low-melting fatty acids which may also be neutralized by the solid alkaline inorganic material to form soaps. It is also possible to add aqueous solutions of detergent components, such as fluorescers, polymers, etc., provided that the total amount of free water is kept within the desired range.

After the first step of the process of the invention, the detergent material still possesses a considerable porosity. Instead of choosing a longer residence time in the high-speed mixer/densifier to obtain a further bulk density increase, the process of the present invention provides a second processing step in which the detergent material is treated for 1–10 minutes, preferably for 2–5 minutes, in a moderate-speed granulator/densifier. During this second processing step, the conditions are such that the powder is brought into, or maintained in, a deformable state. As a consequence, the particle porosity will be further reduced. The main differences with the first step reside in the lower mixing speed and the longer residence time of 1–10 minutes, and the necessity for the powder to be deformable.

The second processing step can be successfully carried out in a Lödige (Trade Mark) KM 300 mixer, also referred to as Lödige Ploughshare. This apparatus essentially consists of a hollow static cylinder having a rotating shaft in the middle. On this shaft various plough-shaped blades are mounted. It can be rotated at a speed of 40–160 rpm. Optionally, one or more high-speed cutters can be used to prevent excessive agglomeration. Another suitable machine for this step is, for example, the Drais (Trade Mark) K-T 160.

For use, handling and storage, the densified detergent powder must obviously no longer be in a deformable state. Therefore, in a final processing step according to the present invention, the densified powder is dried and/or cooled. This step can be carried out in a known manner, for instance in a fluid bed apparatus (drying, cooling) or in an airlift (cooling). It is advantageous if the powder needs a cooling step only, because the required equipment is relatively simple and more economical.

Essential for the second step and preferred for the first step of the process is the deformable state into which the detergent powder must be brought in order to get optimal densification. The high-speed mixer/densifier and/or the moderate speed granulator/densifier are then able to effectively deform the particulate material in such a way that the particle porosity is considerably reduced or kept at a low level, and consequently the bulk density is increased.

The deformability of a detergent powder can be derived from its compression modulus, which in turn can be derived from its stress-strain characteristics. To determine the compression modulus of a specific composition and moisture content, a sample of the composition is compressed to form an airless prill of 13 mm diameter and height. Using an Instron testing machine, the stress-strain diagram during unconfined compression is recorded at a constant strain rate of 10 mm/min. The compression modulus can now be derived from the slope of the stress—versus relative strain diagram during the first part of the compression process, which reflects the elastic deformation. The compression modulus is expressed in MPa. In order to measure the compression modulus at various temperatures, the Instron apparatus can be equipped with a heatable sample holder.

The compression modulus as measured according to the above method was found to correlate well with the particle porosity decrease and the accompanying bulk density increase, under comparable processing conditions. This is further illustrated in the Examples.

The particle porosity was measured by Hg-porosimetry and the moisture content was determined by the weight loss of a sample at 135° C. after 4 hours.

As a general rule, the powder can be considered in a deformable state if the compression modulus as defined above is less than approximately 30 MPa, preferably less than 20 MPa. Even more preferably, the compression modulus is less than 15 MPa and values of 10 MPa and less are particularly preferred.

This deformable state may be induced in a number of ways, for instance means of heat by operating at temperatures above 45° C., and/or by adding liquid to the starting material. When liquids such as water or nonionic surfactants are added, lower temperatures may be employed, for example 35° C. and above.

When heat is chosen for rendering the powder deformable, it may be provided by the internally generated heat from the neutralization reaction between the liquid acid anionic surfactant precursor and the alkaline inorganic material, possibly in combination with other reaction heat such as heat of hydration of water-free sodium tripolyphosphate. It is considered to be a particular advantage of the process of the present invention that the exothermic neutralization reaction between the liquid acid anionic surfactant precursor and the solid alkaline inorganic material causes a substantial temperature increase, which makes the material more deformable. If necessary, the internally generated heat may be supplemented by externally generated heat.

If a spray-dried composition is used as a starting material for the process of the invention, it is preferably used directly after leaving the tower at a temperature of approximately 40° C. or above. The extra heat generated in the neutralization reaction is then usually sufficient to render the material deformable, without any additional measures being taken. Alternatively, the spray-dried powder may be cooled first, e.g. in an airlift, and subsequently be heated again after transportation.

The deformability of a powder depends, among other things, on the chemical composition, the temperature and the moisture content. As to the chemical composition, the liquids to. solids ratio and the amount of polymer proved to be important factors. Moreover, it was generally more difficult to bring phosphate-containing powders into a deformable state than it was for zeolite-containing powders.

Optimal densification results are obtained when the starting material is very deformable. However, when processing very deformable powders, complications may arise with regard to the particle size distribution of the final product. More in particular, a considerable production of oversize particles was observed. This was found to be especially the case when using starting materials which have a high active content, i.e. a content of anionic and/or nonionic surfactants of 20% by weight or more of the starting material.

These problems may be obviated by a preferred embodiment of the invention, in which there is added 0.1 to 40%, and preferably 0.5 to 10% by weight of a powder in the second step or between the first and the second step. This process was found to be particularly useful for preparing powders having a high active content of more than 20% or even 30% by weight.

The powder to be used may be soluble or dispersible and has a mean particle size of 2 to 50 μm, preferably of 2 to 10 μm. Examples of suitable powders are zeolite (e.g. zeolite A4 having a particle size of 4 μm), carbonate (having a particle size of 40 μm) and amorphous calcium silicate, such as Hubersorb (R) 600 (having a particle size of 3.2 μm) ex Huber Corporation. Clays having a suitable particle size may also be used.

It is believed that the addition of the powder prevents or reduces the production of oversize particles, i.e. particles having a diameter of more than 1900 μm, by reducing the stickiness of the detergent powder while it is in a deformable state. As an additional feature of the present invention, the particle size of the detergent composition can be controlled by varying the amount of added powder. It was found that the particle size tends to decrease with increasing amounts of powder, while at smaller amounts of powder an increase of the average particle size is observed.

Another advantage of the method of the present invention is that the storage stability of the final detergent powder is improved. This can be measured by means of the Unconfined Compressibility Test. In this test the detergent powder is placed in a cylinder having a diameter of 13 cm and a height of 15 cm. Subsequently, a weight of 10 kg is placed on top of the powder. After 5 minutes the weight is removed and the walls of the cylinder are taken away. Then an increasing load is placed on top of the column of compressed detergent powder and the weight (in kg) is determined at which the column disintegrates. This value is a function of the stickiness of the detergent powder and proved to be a good measure for the storage stability.

If a spray-dried powder is used as the starting material, the particle porosity is usually considerable and a large increase in bulk density can be obtained by the process of this invention. If a dry-mixed powder is used as the particulate starting material, its particle porosity is generally rather low. Its bulk density can then be only marginally increased by further reducing the particle porosity. However, because in the further processing steps additional components, such as nonionics, are added to the dry-mixed starting materials, the particle porosity could very well increase as a result of the formation of porous agglomerates. According to the invention, this expected increase in porosity is now effectively avoided by operating under deformable conditions. The process of the present invention is therefore also be beneficial in those cases where the particle porosity of the starting materials is low.

A further advantage of the present process resides in the fact that the flexibility with regard to the properties of the particulate starting material is improved. In particular, the moisture content of a spray-dried starting material does not have to be kept within the same strict limits as without applying the process of the invention.

The invention is further illustrated by the following non-limiting Examples in which parts and percentages are by weight unless otherwise indicated.

In the Examples, the following abbreviations are used for the employed materials:

| | |
|---|---|
| ABS | Alkyl benzene sulphonic acid, Dobanoic acid, ex Shell |
| PAS | Primary alkyl sulphate (acid), obtained by sulphatation of Lial 125, a $C_{12}$–$C_{15}$ primary alcohol mixture ex Enichem |
| Soap | Sodium soap of $C_{16}$–$C_{18}$ fatty acid |
| Nonionic | Nonionic surfactant (ethoxylated alcohol), Synperonic A3 or A7 ex ICI (3 or 7EO groups, respectively) |
| Copolymer | Copolymer of maleic and acrylic acid, sold by BASF under the trade-name Sokalan CP5 |
| Carbonate | Sodium carbonate |
| Sulphate | Sodium sulphate |
| Silicate | Sodium alkaline silicate |
| Zeolite | Zeolite A4 (Wessalith [Trade Mark] ex Degussa) |
| SCMC | Sodium carboxy methyl cellulose |

EXAMPLES 1-5

The following solid detergent ingredients were continuously fed into a Lödige (Trade Mark) Recycler CB30, a continuous high speed mixer/densifier, which was described above in more detail. The amounts are given as parts.

TABLE 1

| | Example | | | | |
|---|---|---|---|---|---|
| | 1 | 2 | 3 | 4 | 5 |
| Zeolite (78%) | 41.8 | 41.8 | 33.3 | 49.1 | 38.5 |
| Carbonate | 18.6 | 18.6 | 10.4 | 20.2 | 22.4 |
| Soap | 0.7 | 0.7 | — | — | — |
| Sulphate | 2.0 | 2.0 | — | — | — |
| Silicate (80%) | — | 5.0 | — | — | — |
| SCMC (73%) | 1.2 | 1.2 | 0.8 | — | — |
| Fluorescer | 0.2 | 0.2 | 0.3 | — | — |
| Total | 64.5 | 69.5 | 44.8 | 69.3 | 60.9 |

The zeolite was added in the form of a powder containing 78% by weight pure zeolite, the remainder being water. The silicate contained 20% by weight of water and the SCMC was of 73% purity. The following liquids were also continuously added in the Recycler, as indicated in Table 2.

TABLE 2

| | Example | | | | |
|---|---|---|---|---|---|
| | 1 | 2 | 3 | 4 | 5 |
| ABS | 21.8 | 21.8 | 8.6 | 21.8 | — |
| PAS | — | — | — | — | 21.6 |
| Nonionic.7EO | 1.5 | 1.5 | 2.8 | — | 2.0 |
| Nonionic.3EO | — | — | 4.7 | — | — |
| Copolymer (40%) | 5.0 | 5.0 | 5.0 | 5.0 | 2.5 |
| Silicate (45%) | 8.9 | — | — | 8.9 | 7.8 |

The primary alkyl sulphate liquid anionic surfactant precursor (PAS) was prepared by direct sulphatation of the corresponding primary alcohol in a known type of sulphatation reaction, of the sort used for sulphonation of alkyl benzenes. The PAS was then fed directly into the process. The polymer and the silicate were added as aqueous solutions of 40% and 45% by weight, respectively. The rotational speed of the Lodige Recycler was 1800 rpm for Examples 1–4 and 1890 rpm for Example 5. The powders were produced at a rate of between 1100 and 1300 kg/h; the mean residence time of the powder in the Lödige Recycler was approximately 10 seconds. Further details of the processing conditions and the properties of the powder after leaving the Lödige Recycler are given in Table 3.

TABLE 3

| | Example | | | | |
|---|---|---|---|---|---|
| | 1 | 2 | 3 | 4 | 5 |
| Powder temperature (°C.) | 61 | 70 | 64 | 64 | 63 |
| Bulk density [kg/m$^3$] | 636 | 627 | 697 | 662 | 741 |
| Particle porosity [%] | 25 | 26 | — | 23 | 10 |
| Moisture content [%] | 10.1 | 8.1 | 8.0 | 15 | 16 |
| Particle size [μm] | 665 | 775 | 731 | 439 | 805 |
| Modulus [MPa] at 60° C. | 20 | 21 | 18 | 20 | 16 |

After leaving the Lödige Recycler, the powder was fed into a Lödige (Trade Mark) KM 300 "Ploughshare" mixer, a continuous moderate-speed granulator/densifier, operated at 120 rpm and the cutters on. In this apparatus a fine zeolite powder having a particle size of 4 μm was added, in the amounts given in Table 4. The mean residence time of the powder in the Ploughshare mixer was about 3 minutes. Further processing conditions and properties of the powder after leaving the Lödige Ploughshare mixer are given in Table 4.

TABLE 4

| | Example | | | | |
|---|---|---|---|---|---|
| | 1 | 2 | 3 | 4 | 5 |
| Temperature [°C.] | 62 | 63 | 55 | 55 | 57 |
| Addition of: | | | | | |
| Zeolite A4 (78%) | 5.1 | 5.1 | 6.4 | — | 3.9 |
| Bulk density [kg/m$^3$] | 792 | 810 | 836 | 778 | 922 |
| Particle porosity [%] | 16 | 13 | n.d. | 12 | 6 |
| Moisture content [%] | 9.6 | 8.3 | 7.8 | 13 | 15.7 |
| Particle size [μm] | 677 | 715 | 668 | 464 | 713 |

After leaving the moderate-speed granulator/densifier, the bulk density of the powder is very high. In order to obtain the final powder, a cooling step was needed which was carried out in an Anhydro (Trade mark) fluid bed. The chemical compositions of the resulting detergent powders after cooling are given in Table 5, their properties in Table 6. The amounts relate to the pure compounds.

TABLE 5

| Powder composition: | Example | | | | |
|---|---|---|---|---|---|
| | 1 | 2 | 3 | 4 | 5 |
| Zeolite | 36.6 | 36.6 | 45.9 | 38.3 | 41.5 |
| Carbonate | 15.0 | 15.0 | 13.3 | 16.6 | 14.4 |
| Soap | 0.7 | 0.7 | — | — | — |
| Sulphate | 2.0 | 2.0 | — | — | — |
| SCMS | 0.9 | 0.9 | 0.9 | — | — |
| Fluorescer | 0.2 | 0.2 | 0.7 | — | — |
| ABS | 23.3 | 23.3 | 13.6 | 23.3 | — |
| PAS | — | — | — | — | 23.1 |
| Nonionic.7EO | 1.5 | 1.5 | 4.1 | — | 2.0 |
| Nonionic.3EO | — | — | 7.0 | — | — |
| Copolymer | 2.0 | 2.0 | 3.0 | 2.0 | 1.0 |
| Silicate | 4.0 | 4.0 | — | 4.0 | 3.5 |
| Water | 13.8 | 13.8 | 11.5 | 15.8 | 14.5 |
| Total | 100.0 | 100.0 | 100.0 | 100.0 | 100.0 |

TABLE 6

| Powder properties: | Example | | | | |
|---|---|---|---|---|---|
| | 1 | 2 | 3 | 4 | 5 |
| Bulk density [kg/m$^3$] | 805 | 867 | 840 | 811 | 868 |
| Dynamic Flow Rate [ml/s] | 119 | 131 | 110 | 99 | 120 |
| Unconfined Compressibility | 1.5 | 1.2 | 0.2 | n.d. | n.d. |

TABLE 6-continued

| Powder properties: | Example | | | | |
|---|---|---|---|---|---|
| | 1 | 2 | 3 | 4 | 5 |
| Test [kg] | | | | | |
| Particle porosity [%] | 12 | 10 | n.d. | 8 | 6 |
| Moisture content [%] | 8.2 | 7.6 | 6.6 | 12.8 | 14.5 |
| Particle size [μm] | 562 | 687 | 524 | 475 | 668 |

To the compositions of Examples 1, 2, 4 and 5 so-called minor ingredients were added (enzymes, perfume in case 4 also fluorescer) to formulate a complete fabric washing powder. The composition of Example 3 was used as a base powder and was supplemented with TAED/perborate monohydrate bleach particles, antifoam granules, enzymes and perfume to formulate a bleaching fabric washing powder.

We claim:

1. Process for the continuous preparation of a granular detergent composition or component having a bulk density of at least 550 g/l, which comprises (i) feeding a liquid acid precursor of an anionic surfactant, a solid water-soluble alkaline inorganic material and optionally other materials into a high-speed mixer/densifier, the mean residence time being from about 5 to 30 seconds, whereby said liquid acid precursor is partly or totally neutralized, to obtain a powder;

(ii) subsequently mixing said powder in a moderate-speed granulator/densified, said powder thereby being brought into or maintained in a deformable state, said mixing of the powder in said deformable state reducing the intraparticle porosity of said powder the mean residence time being from about 1-10 minutes; and finally (iii) drying and/or cooling said powder.

2. Process according to claim 1, whereby the powder is already brought into or maintained in a deformable state in the first step.

3. Process according to claim 1, wherein the deformable state is at least partially brought about by the heat of neutralization of the acid surfactant precursor.

4. Process according to claim 1, wherein the solid water-soluble alkaline inorganic material comprises sodium carbonate.

5. Process according to claim 1, wherein the deformable state is brought about by operating at temperature above 40° C. and/or adding liquid to the powder.

6. Process according to claim 1, wherein nonionics, anionics, silicate and/or water are added in the first step.

7. Process according to claim 1, wherein 0.1 to 40% by weight of a second powder is added in the second step or between the first and the second step, said second powder having a particle size of 2 to 50 μm and being selected from the group consisting of fine zeolite powder, sodium carbonate and amorphous calcium silicate.

8. Process according to claim 1, wherein 0.5 to 10% by weight of a second powder is added in the second step or between the first and the second step.

9. Process according to claim 1, wherein 0.1 to 40% by weight of a second powder is added in the second step or between the first and the second step, said powder having a particle size of 2 to 10 μm.

10. Process according to claim 1, wherein the detergent composition in the second step contains more than 20% actives.

11. Process according to claim 1, wherein the detergent composition in the second step has a compression modulus of less than 20 MPa.

12. Process according to claim 1, wherein the particle porosity of the final granular detergent product is less than 15%.

13. Process according to claim 1, wherein the mean residence time in the moderate-speed granulator/densifier is from about 2 to 5 minutes.

14. Process according to claim 1, wherein the particle porosity of the final granular detergent product is less than 10%.

15. Process according to claim 1, wherein the detergent composition in the second step contains more than 30% actives.

* * * * *